(12) United States Patent
Zhang et al.

(10) Patent No.: US 11,212,789 B2
(45) Date of Patent: Dec. 28, 2021

(54) INFORMATION SENDING METHOD AND DEVICE

(71) Applicant: HUAWEI TECHNOLOGIES CO., LTD., Guangdong (CN)

(72) Inventors: Xu Zhang, Beijing (CN); Lixia Xue, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 135 days.

(21) Appl. No.: 16/787,572

(22) Filed: Feb. 11, 2020

(65) Prior Publication Data
US 2020/0178234 A1 Jun. 4, 2020

Related U.S. Application Data

(63) Continuation of application No. PCT/CN2018/100084, filed on Aug. 10, 2018.

(30) Foreign Application Priority Data

Aug. 11, 2017 (CN) .......................... 201710687765.0

(51) Int. Cl.
*H04W 72/04* (2009.01)
*H04L 5/00* (2006.01)

(52) U.S. Cl.
CPC ......... *H04W 72/042* (2013.01); *H04L 5/0007* (2013.01); *H04L 5/0048* (2013.01); *H04L 5/0092* (2013.01); *H04W 72/044* (2013.01)

(58) Field of Classification Search
CPC ... H04L 5/0007; H04L 5/0048; H04L 5/0092; H04W 72/042; H04W 72/044
See application file for complete search history.

(56) References Cited

U.S. PATENT DOCUMENTS 9,385,850 B2 * 7/2016 Park ...................... H04L 5/0053
9,438,400 B2 * 9/2016 Horiuchi ............. H04W 72/042
(Continued)

FOREIGN PATENT DOCUMENTS

BR 112013031729 A2 * 12/2016 ............. H04L 5/001
CN 102711253 A 10/2012
(Continued)

OTHER PUBLICATIONS

Huawei et al., CCE-to-REG mapping, Feb. 13, 2017, 3GPP TSG RAN WG1 Meeting #88, Tdoc: R1-1701638 (Year: 2017).*
(Continued)

*Primary Examiner* — Eric Nowlin
(74) *Attorney, Agent, or Firm* — Fish & Richardson P.C.

(57) ABSTRACT

The present disclosure relates to information sending methods and devices. One example method includes determining, by a network device, a physical downlink control channel, where the physical downlink control channel includes at least one control channel element (CCE), the at least one CCE is mapped to a resource element group (REG) bundle set, the REG bundle set includes N REG clusters that are discrete in frequency domain, each REG cluster includes a plurality of consecutive physical resource blocks in frequency domain, N is less than M, M is a quantity of REG clusters included in a control resource set, and both N and M are positive integers, and sending, by the network device, downlink control information by using the physical downlink control channel.

20 Claims, 11 Drawing Sheets

(56) References Cited

U.S. PATENT DOCUMENTS

| | | | | |
|---|---|---|---|---|
| 9,537,634 | B2 * | 1/2017 | Seo | H04L 5/0053 |
| 9,603,138 | B2 * | 3/2017 | Zhao | H04W 72/042 |
| 9,622,241 | B2 * | 4/2017 | Wong | H04W 4/70 |
| 9,647,813 | B2 * | 5/2017 | Horiuchi | H04L 5/0048 |
| 9,654,263 | B2 * | 5/2017 | Tang | H04L 5/0048 |
| 9,929,836 | B2 * | 3/2018 | Horiuchi | H04W 72/042 |
| 9,973,318 | B2 * | 5/2018 | Zhang | H04B 7/0626 |
| 10,264,570 | B2 * | 4/2019 | Tang | H04L 5/0007 |
| 10,326,567 | B2 * | 6/2019 | Horiuchi | H04L 5/0048 |
| 10,455,573 | B2 * | 10/2019 | Kwak | H04W 72/042 |
| 10,523,381 | B2 * | 12/2019 | Horiuchi | H04L 5/001 |
| 10,547,413 | B2 * | 1/2020 | Seo | H04B 7/0617 |
| 10,615,910 | B2 * | 4/2020 | Seo | H04L 5/0094 |
| 10,667,250 | B2 * | 5/2020 | Shimezawa | H04L 27/26 |
| 10,715,298 | B2 * | 7/2020 | Xiong | H04L 5/001 |
| 10,757,581 | B2 * | 8/2020 | Hwang | H04L 5/0094 |
| 10,763,939 | B2 * | 9/2020 | Zhou | H04B 7/0408 |
| 10,764,883 | B2 * | 9/2020 | Tang | H04W 72/042 |
| 10,785,762 | B2 * | 9/2020 | Tang | H04L 5/0046 |
| 10,813,113 | B2 * | 10/2020 | Shimezawa | H04W 72/0446 |
| 10,863,511 | B2 * | 12/2020 | Cheng | H04W 72/046 |
| 10,904,872 | B2 * | 1/2021 | Ren | H04L 5/0053 |
| 10,912,073 | B2 * | 2/2021 | Kwak | H04L 5/0007 |
| 10,944,510 | B2 * | 3/2021 | Seo | H04L 1/0071 |
| 10,952,237 | B2 * | 3/2021 | Liu | H04L 5/0053 |
| 10,992,433 | B2 * | 4/2021 | Hosseini | H04L 5/0058 |
| 11,005,637 | B2 * | 5/2021 | Yi | H04W 24/08 |
| 11,018,803 | B2 * | 5/2021 | Seo | H04L 1/0046 |
| 11,057,168 | B2 * | 7/2021 | Horiuchi | H04W 72/1273 |
| 11,057,891 | B2 * | 7/2021 | Cheng | H04W 72/046 |
| 11,070,344 | B2 * | 7/2021 | You | H04W 72/0406 |
| 11,071,170 | B2 * | 7/2021 | Xiong | H04L 5/0053 |
| 2014/0126506 | A1 * | 5/2014 | Horiuchi | H04L 5/0048 370/329 |
| 2016/0014718 | A1 | 1/2016 | Mysore Balasubramanya et al. | |
| 2016/0337095 | A1 * | 11/2016 | Horiuchi | H04W 72/1273 |
| 2017/0207887 | A1 * | 7/2017 | Horiuchi | H04L 5/001 |
| 2018/0175980 | A1 * | 6/2018 | Horiuchi | H04L 5/001 |
| 2019/0253209 | A1 * | 8/2019 | Horiuchi | H04W 72/1273 |
| 2020/0092054 | A1 * | 3/2020 | Horiuchi | H04W 72/1273 |

FOREIGN PATENT DOCUMENTS

| | | | | | |
|---|---|---|---|---|---|
| CN | 103563469 | A | * | 2/2014 | H04W 72/1273 |
| CN | 103580834 | A | | 2/2014 | |
| CN | 104769871 | A | | 7/2015 | |
| CN | 106105057 | A | | 11/2016 | |
| CN | 106850157 | A | | 6/2017 | |
| CN | 107005376 | A | | 8/2017 | |
| CN | 103563469 | B | * | 3/2018 | H04W 72/042 |
| CN | 108111292 | A | * | 6/2018 | H04L 5/0048 |
| CN | 108173636 | A | * | 6/2018 | H04W 72/042 |
| CN | 108111292 | B | * | 11/2020 | H04W 72/042 |
| CN | 108173636 | B | * | 1/2021 | H04W 72/042 |
| DK | 2816855 | T3 | * | 10/2018 | H04W 72/1273 |
| EP | 2816855 | A1 | * | 12/2014 | H04L 5/001 |
| EP | 2816855 | A4 | * | 4/2015 | H04L 5/0048 |
| EP | 2816855 | B1 | * | 6/2018 | H04L 5/0048 |
| EP | 3367605 | A1 | * | 8/2018 | H04L 5/001 |
| EP | 3367605 | B1 | * | 6/2019 | H04L 5/001 |
| EP | 3522438 | A1 | * | 8/2019 | H04W 72/1273 |
| EP | 3522438 | B1 | * | 7/2020 | H04W 72/1273 |
| EP | 3709557 | A1 | * | 9/2020 | H04L 5/0048 |
| ES | 2688823 | T3 | * | 11/2018 | H04L 5/0048 |
| HU | E039684 | T2 | * | 1/2019 | H04L 5/001 |
| JP | WO2013168389 | A1 | * | 1/2016 | H04L 5/001 |
| JP | 6176533 | B2 | * | 8/2017 | H04W 72/1273 |
| JP | 2017200224 | A | * | 11/2017 | H04L 5/0048 |
| JP | 6366026 | B2 | * | 8/2018 | H04W 72/1273 |
| KR | 20150016062 | A | * | 2/2015 | H04L 5/001 |
| KR | 20180122904 | A | * | 11/2018 | |
| KR | 102170874 | B1 | * | 10/2020 | H04W 72/042 |
| LT | 2816855 | T | * | 10/2018 | H04L 5/0048 |
| MX | 2013015090 | A | * | 2/2014 | H04W 72/042 |
| MX | 336451 | B | * | 1/2016 | H04W 72/042 |
| PL | 2816855 | T3 | * | 1/2019 | H04L 5/001 |
| PT | 2816855 | T | * | 10/2018 | H04W 72/042 |
| RU | 2013154543 | A | * | 6/2015 | H04W 72/1273 |
| RU | 2601738 | C2 | * | 11/2016 | H04L 5/0048 |
| SI | 2816855 | T1 | * | 10/2018 | H04W 72/1273 |
| WO | WO-2013168389 | A1 | * | 11/2013 | H04W 72/1273 |
| WO | 2014019202 | A1 | | 2/2014 | |
| WO | 2014019284 | A1 | | 2/2014 | |

OTHER PUBLICATIONS

Guangdong OPPO Mobile Telecom, On NR PDCCH Structure and CCE-PRB mapping, Feb. 13, 2017, 3GPP TSG RAN WG1 Meeting #88, Tdoc: R1-1701950 (Year: 2017).*

Sharp, CCE to REG mapping for NR, Feb. 13, 2017, 3GPP TSG RAN WG1 Meeting #88, Tdoc: R1-1703238 (Year: 2017).*

Ericsson, On CCE Mapping to REGs, Feb. 13, 2017, 3GPP TSG RAN WG1 Meeting #88, Tdoc: R1-1703285 (Year: 2017).*

ZTE et al., WF on NR DL Control CCE mapping, Feb. 13, 2017, 3GPP TSG RAN WG1 Meeting #88, Tdoc: R1-1703540 (Year: 2017).*

Vivo, Performance of various NR CCE/REG design, Apr. 3, 2017, 3GPP TSG RAN WG1 88bis Meeting, Tdoc: R1-1704494 (Year: 2017).*

Guangdong OPPO Mobile Telecom, On NR PDCCH structure and CCE-REG mapping, Apr. 3, 2017, 3GPP TSG RAN WG1 88bis Meeting, Tdoc: R1-1704615 (Year: 2017).*

Panasonic, The relation among RS, REG, CCE, and CORSET, Apr. 3, 2017, 3GPP TSG RAN WG1 88bis Meeting, Tdoc: R1-1705173 (Year: 2017).*

Sharp, REG-to-CCE mapping for NR, Apr. 3, 2017, 3GPP TSG RAN WG1 #88bis Meeting, Tdoc: R1-1705471 (Year: 2017).*

Huawei et al., CCE-to-REG Mapping, May 15, 2017, 3GPP TSG RAN WG1 Meeting #89, Tdoc: R1-1706946 (Year: 2017).*

ZTE, Analysis and simulation of REG bundling, May 15, 2017, 3GPP TSG RAN WG1 Meeting #89, Tdoc: R1-1707157 (Year: 2017).*

LG Electronics, Discussion on REG bundling, May 15, 2017, 3GPP TSG RAN WG1 Meeting #89, Tdoc: R1-1707623 (Year: 2017).*

Guangdong OPPO Mobile Telecom, NR-PDCCH CCE-to-REG mapping with REG bundling, May 15, 2017, 3GPP TSG RAN WG1 Meeting #89, Tdoc: R1-1707623 (Year: 2017).*

ETRI, On REG interleaving for distributed NR-PDCCH, May 15, 2017, 3GPP TSG RAN WG1 Meeting #89, Tdoc: R1-1708098 (Year: 2017).*

Panasonic, The relation among RS, REG, CCE, and CORESET, May 15, 2017, 3GPP TSG RAN WG1 Meeting #89, Tdoc: R1-1708108 (Year: 2017).*

Interdigital Inc., On REG bundling for PDCCH, May 15, 2017, 3GPP TSG RAN WG1 Meeting #89, Tdoc: R1-1708346 (Year: 2017).*

Sharp, REG bundling per CCE for NR PDCCH, May 15, 2017, 3GPP TSG RAN WG1 Meeting #89, Tdoc: R1-1708370 (Year: 2017).*

CMCC, Evaluation on CCE-to-PDCCH mapping, May 15, 2017, 3GPP TSG RAN WG1 Meeting #89, Tdoc: R1-1708395 (Year: 2017).*

Nokia et al., Evaluation of intereaved CCE-to-REG mapping schemes for DL control channel, May 15, 2017, 3GPP TSG RAN WG1 Meeting #89, Tdoc: R1-1708499 (Year: 2017).*

ITRI, Discussion on REG bundle in time-domain, May 15, 2017, 3GPP TSG RAN WG1 Meeting #89, Tdoc: R1-1708716 (Year: 2017).*

Ericsson, On REG Bundle and CCE Size for NR-PDCCH, May 15, 2017, 3GPP TSG RAN WG1 Meeting #89, Tdoc: R1-1709066 (Year: 2017).*

Huawei et al., Overview of PDCCH-CCE-REG mapping and REG bundling, Jun. 27, 2017, 3GPP TSG RAN WG1 NR Ad-Hoc Meeting, Tdoc: R1-1710011 (Year: 2017).*

ZTE, CCE mapping with REG bundling, Jun. 27, 2017, 3GPP TSG RAN WG1 NR Ad-Hoc Meeting, Tdoc: R1-1710104 (Year: 2017).*

(56) References Cited

OTHER PUBLICATIONS

Guangdong OPPO Mobile Telecom, NR-PDCCH CCE-to-REG mapping with REG bundling, Jun. 27, 2017, 3GPP TSG RAN WG1 NR Ad-Hoc Meeting, Tdoc: R1-1710148 (Year: 2017).*
Spreadtrum Communications, Discussion on NR-REG to NR-CCE time-/frequency mapping, Jun. 27, 2017, 3GPP TSG RAN WG1 NR Ad-Hoc Meeting, Tdoc: R1-1710366 (Year: 2017).*
Vivo, Discussion on REG bundling size/structure, Jun. 27, 2017, 3GPP TSG RAN WG1 NR Ad-Hoc Meeting, Tdoc: R1-1710390 (Year: 2017).*
ETRI, NR-PDCCH mapping structure and REG bundle size, Jun. 27, 2017, 3GPP TSG RAN WG1 NR Ad-Hoc Meeting, Tdoc: R1-1710614 (Year: 2017).*
ITRI, Discussion on REG bundle size, Jun. 27, 2017, 3GPP TSG RAN WG1 NR Ad-Hoc Meeting, Tdoc: R1-1710973 (Year: 2017).*
Sharp, REG bundling for NR PDCCH, Jun. 27, 2017, 3GPP TSG RAN WG1 NR Ad-Hoc Meeting, Tdoc: R1-1711235 (Year: 2017).*
Panasonic, The relation among REG, CCE, and CORESET, Jun. 27, 2017, 3GPP TSG RAN WG1 NR Ad-Hoc Meeting, Tdoc: R1-1711327 (Year: 2017).*
Huawei et al., CCE-to-REG Mapping, Jun. 27, 2017, 3GPP TSG RAN WG1 NR Ad-Hoc Meeting, Tdoc: R1-1711413 (Year: 2017).*
KT Corp., Views on CCE-to-REG mapping, Jun. 27, 2017, 3GPP TSG RAN WG1 NR Ad-Hoc Meeting, Tdoc: R1-1711475 (Year: 2017).*
Office Action in Chinese Application No. 201710687765.0, dated Mar. 12, 2021, 13 pages.
Huawei et al., "CCE-to-REG Mapping," 3GPP TSG RAN WG1 NR Ad-Hoc Meeting, R1-1711413, Qingdao, China, Jun. 27-30, 2017, 12 pages.
Office Action in Japanese Application No. 2020529804, dated May 25, 2021, 7 pages.
3GPP TS 38.211 V0.1 0 (Jun. 2017), "3rd Generation Partnership Project;Technical Specification Group Radio Access Network; NR; Physical channels and modulation (Release 15)," Jun. 2017, 22 pages.
Ericsson, "On NR-PDCCH Structure," 3GPP TSG-RAN WG1 NR Ad-Hoc#2, R1-1711477, Qingdao, P.R. China, May 27-30, 2017, 8 pages.
Extended European Search Report issued in European Application No. 18843595.2 dated Jul. 1, 2020, 10 pages.
Huawei et al., "Overview of PDCCH-CCE-REG mapping and REG bundling," 3GPP TSG RAN WG1 NR Ad-Hoc Meeting, R1-1710011, Qingdao, China, Jun. 27-30, 2017, 7 pages.
PCT International Search Report and Written Opinion issued in International Application No. PCT/CN2018/100084 dated Oct. 31, 2018, 9 pages (with English translation).

* cited by examiner ically included six REGS, the six REGS may be distributed in a REG group 1, a REG group 2, and a REG group 3 of a control resource set.

INFORMATION SENDING METHOD AND DEVICE

CROSS-REFERENCE TO RELATED APPLICATIONS

This application is a continuation of International Application No. PCT/CN2018/100084, filed on Aug. 10, 2018, Which claims priority to Chinese Patent Application No. 201710687765.0, filed on Aug. 11, 2017. The disclosures of the aforementioned applications are hereby incorporated by reference in their entireties.

TECHNICAL FIELD

This application relates to the field of wireless communications technologies, and in particular, to an information sending method and a device.

BACKGROUND

In a fourth generation radio access standard long term evolution (LTE) system, a physical downlink control channel (PDCCH) is mainly used to carry scheduling and other control information, such as a transport format, resource allocation, an uplink scheduling grant, and power control.

In the LTE system, the PDCCH mainly includes a plurality of control channel elements (CCE), and the CCE is used to carry control information. The CCE usually includes a plurality of resource element groups (REG). A REG usually refers to a time-frequency resource that occupies P consecutive subcarriers in frequency domain and one consecutive OFDM symbol in time domain, and P is an integer greater than 1.

In the prior art, there is a concept of control resource set. A control resource set includes a plurality of REG groups, and each REG group includes a plurality of REGs. For example, as shown in FIG. 1, a control resource set may include three REG groups: a REG group 1, a REG group 2, and a REG group 3. Each REG group includes 16 REGs: a REG 1, a REG 2, a REG 3, a REG 4, a REG 5, a REG 6, a REG 7, a REG 8, a REG 9, a REG 10, a REG 11, a REG 12, a REG 13, a REG 14, a REG 15, and a REG 16.

In the prior art, determining REGs that form a CCE of a PDCCH is specifically a mapping process. Interleaved mapping is taken as an example. The REGs of the CCE may be uniformly distributed in each REG group of a control channel resource set. For example, as shown in FIG. 2, if a CCE includes six REGs, the six REGs may be distributed in a REG group 1, a REG group 2, and a REG group 3 of a control resource set.

In the prior art, in an interleaved mapping manner, each CCE of the PDCCH is mapped within all the REG groups of the control resource set, leading to a high fragmentation rate and low utilization rate of the control resource set.

SUMMARY

This application provides an information sending method and a device, which may reduce the degree of fragmentation and improve the resource utilization rate of a control resource set.

According to a first aspect, an information sending method is provided. The method includes: determining, by a network device, a physical downlink control channel, where the physical downlink control channel includes at least one control channel element CCE, the at least one CCE is mapped to a REG bundle set, the REG bundle set includes N REG clusters that are discrete in frequency domain, each REG cluster includes a plurality of consecutive physical resource blocks in frequency domain, N is less than M, M is a quantity of REG clusters included in a control resource set, and both N and M are positive integers; and sending, by the network device, downlink control information by using the physical downlink control channel.

In a possible design, the determining, by a network device, a physical downlink control channel includes: determining, by the network device, a first CCE; and mapping, by the network device, the first CCE to each REG cluster in the REG bundle set in an interleaved manner, where quantities of REGs that are used to map the first CCE and that are in at least two of the REG clusters are different.

In a possible design, the mapping, by the network device, the first CCE to each REG cluster in the REG bundle set in an interleaved manner includes: distributing, by the network device, REG bundles included in the first CCE into the REG bundle set at equal spacings, where the REG bundle includes a plurality of REGs that are consecutive in time domain and/or frequency domain.

In a possible design, the determining, by a network device, a physical downlink control channel includes: obtaining, by the network device, a second CCE; and mapping, by the network device, the second CCE to a REG cluster in the REG bundle set in a non-interleaved manner, where the REG cluster includes X REG resources in frequency domain, the second CCE needs to occupy Y REG resources in frequency domain, X and Y are integers, and X is an integral multiple of Y.

In a possible design, the REG cluster includes P REGs in frequency domain, and P is a multiple of C.

In a possible design, the REG bundle set includes a plurality of REG clusters, and a frequency-domain spacing between adjacent REG clusters in the plurality of REG clusters is proportional to the quantity of REG clusters included in the control resource set.

In a possible design, the REG bundle set includes N REG clusters, a value of N is determined based on the quantity of REG clusters included in the control resource set, and N is an integer.

In a possible design, the first CCE is mapped in an interleaved manner in a unit of a first REG bundle, the second CCE is mapped in a unit of a second REG bundle, a quantity of REGs included in the first REG bundle is the same as a quantity of REGs included in the second REG bundle, and the REG bundle includes a plurality of REGs that are consecutive in time domain and/or frequency domain.

According to a second aspect, an information receiving method is provided. The method includes: determining, by a terminal device, a physical downlink control channel, where the physical downlink control channel includes at least one control channel element CCE, the at least one CCE is mapped to a REG bundle set, the REG bundle set includes N REG clusters that are discrete in frequency domain, each REG cluster includes a plurality of consecutive physical resource blocks in frequency domain, N is less than M, M is a quantity of REG clusters included in a control resource set, and both N and M are positive integers; and receiving, by the terminal device, downlink control information through the physical downlink control channel.

In a possible design, the physical downlink control channel includes a first CCE, the first CCE is mapped to each REG cluster in the REG bundle set in an interleaved manner, and quantities of REGs that are used to map the first CCE and that are in at least two of the REG clusters are different.

In a possible design, REG bundles included in the first CCE are distributed in the REG bundle set at equal spacings, and the REG bundle includes a plurality of REGs that are consecutive in time domain and/or frequency domain.

In a possible design, the physical downlink control channel includes a second CCE, the second CCE is mapped to a REG cluster in the REG bundle set in a non-interleaved manner, the REG cluster includes X REG resources in frequency domain, the second CCE needs to occupy Y REG resources in frequency domain, X and Y are integers, and X is an integral multiple of Y.

In a possible design, the REG cluster includes P REGs in frequency domain, and P is a multiple of 6.

In a possible design, the REG bundle set includes a plurality of REG clusters, and a frequency-domain spacing between adjacent REG clusters in the plurality of REG clusters is proportional to the quantity of REG clusters included in the control resource set.

In a possible design, the REG bundle set includes N REG clusters, a value of N is determined based on the quantity of REG clusters included in the control resource set, and N is an integer.

In a possible design, the first CCE is mapped in an interleaved manner in a unit of a first REG bundle, the second CCE is mapped in a unit of a second REG bundle, a quantity of REGs included in the first REG bundle is the same as a quantity of REGs included in the second REG bundle, and the REG bundle includes a plurality of REGs that are consecutive in time domain and/or frequency domain.

According to a third aspect, a network device is provided. The network device includes: a processor, configured to determine a physical downlink control channel, where the physical downlink control channel includes at least one control channel element CCE, the at least one CCE is mapped to a REG bundle set, the REG bundle set includes N REG clusters that are discrete in frequency domain, each REG cluster includes a plurality of consecutive physical resource blocks in frequency domain, N is less than M, M is a quantity of REG clusters included in a control resource set, and both N and M are positive integers; and a transceiver, configured to send downlink control information by using the physical downlink control channel.

In a possible design, when determining the physical downlink control channel, the processor is specifically configured to: determine a first CCE; and map the first CCE to each REG cluster in the REG bundle set in an interleaved manner, where quantities of REGs that are used to map the first CCE and that are in at least two of the REG clusters are different.

In a possible design, when mapping the first CCE to each REG cluster in the REG bundle set in an interleaved manner, the processor is specifically configured to distribute REG bundles included in the first CCE into the REG bundle set at equal spacings, where the REG bundle includes a plurality of REGs that are consecutive in time domain and/or frequency domain.

In a possible design, when determining the physical downlink control channel, the processor is specifically configured to: obtain a second CCE; and map the second CCE to a REG cluster in the REG bundle set in a non-interleaved manner, where the REG cluster includes X REG resources in frequency domain, the second CCE needs to occupy Y REG resources in frequency domain, X and Y are integers, and X is an integral multiple of Y.

In a possible design, the REG cluster includes P REGs in frequency domain, and P is a multiple of 6.

In a possible design, the REG bundle set includes a plurality of REG clusters, and a frequency-domain spacing between adjacent REG clusters in the plurality of REG clusters is proportional to the quantity of REG clusters included in the control resource set.

In a possible design, the REG bundle set includes N REG clusters, a value of N is determined based on the quantity of REG clusters included in the control resource set, and N is an integer.

In a possible design, the first CCE is mapped in an interleaved manner in a unit of a first REG bundle, the second CCE is mapped in a unit of a second REG bundle, a quantity of REGs included in the first REG bundle is the same as a quantity of REGs included in the second REG bundle, and the REG bundle includes a plurality of REGs that are consecutive in time domain and/or frequency domain.

According to a fourth aspect, a terminal device is provided. The terminal device includes: a processor, configured to determine a physical downlink control channel, where the physical downlink control channel includes at least one control channel element CCE, the at least one CCE is mapped to a REG bundle set, the REG bundle set includes N REG clusters that are discrete in frequency domain, each REG cluster includes a plurality of consecutive physical resource blocks in frequency domain, N is less than M, M is a quantity of REG clusters included in a control resource set, and both N and M are positive integers; and a transceiver, configured to receive downlink control information through the physical downlink control channel.

In a possible design, the physical downlink control channel includes a first CCE, the first CCE is mapped to each REG cluster in the REG bundle set in an interleaved manner, and quantities of REGs that are used to map the first CCE and that are in at least two of the REG clusters are different.

In a possible design, REG bundles included in the first CCE are distributed in the REG bundle set at equal spacings, and the REG bundle includes a plurality of REGs that are consecutive in time domain and/or frequency domain.

In a possible design, the physical downlink control channel includes a second CCE, the second CCE is mapped to a REG cluster in the REG bundle set in a non-interleaved manner, the REG cluster includes X REG resources in frequency domain, the second CCE needs to occupy Y REG resources in frequency domain, X and Y are integers, and X is an integral multiple of Y.

In a possible design, the REG cluster includes P REGs in frequency domain, and P is a multiple of 6.

In a possible design, the REG bundle set includes a plurality of REG clusters, and a frequency-domain spacing between adjacent REG clusters in the plurality of REG clusters is proportional to the quantity of REG clusters included in the control resource set.

In a possible design, the REG bundle set includes N REG clusters, a value of N is determined based on the quantity of REG clusters included in the control resource set, and N is an integer.

In a possible design, the first CCE is mapped in an interleaved manner in a unit of a first REG bundle, the second CCE is mapped in a unit of a second REG bundle, a quantity of REGs included in the first REG bundle is the same as a quantity of REGs included in the second REG bundle, and the REG bundle includes a plurality of REGs that are consecutive in time domain and/or frequency domain.

According to a fifth aspect, a readable storage medium is provided. The readable storage medium includes an instruction. When the instruction is run on a communications device, the communications device is enabled to perform the method according to any one of the foregoing aspects.

According to a sixth aspect, a chip is provided. The chip is connected to a memory, and is configured to read and execute a software program stored in the memory, to implement the method according to any one of the foregoing aspects.

According to a seventh aspect, a computer program is provided. The computer program includes a computer instruction. When the computer instruction is executed by a computer, the computer is enabled to perform the method according to any one of the foregoing aspects.

According to an eighth aspect, a communications system is provided. The communications system includes the network device according to the third aspect and the terminal device according to the fourth aspect.

In this application, because the CCE included in the physical downlink control channel is mapped to one REG bundle set in a plurality of REG bundle sets included in the control resource set, the CCE can occupy only REG resources in the REG bundle set. Compared with the prior art in which a CCE is mapped on an entire physical downlink control channel, and may occupy REG resources on the entire physical downlink control channel, the method provided in this application can reduce the degree of fragmentation of the physical downlink control channel and improve the resource utilization rate.

DESCRIPTION OF EMBODIMENTS

For ease of understanding, the following describes, as examples, concepts related to this application for reference.

A base station (BS) device, also referred to as a base station, is an apparatus deployed on a radio access network to provide a wireless communication function. For example, devices providing a base station function in a 2G network include a base transceiver station (BTS) and a base station controller (base station controller, BSC), devices providing a base station function in a 3G network include a NodeB and a radio network controller (RNC), devices providing a base station function in a 4G network include an evolved NodeB (eNB), and a device providing a base station function in a WLAN is an access point (access point, AP). In a future 5G network such as a new radio (NR) or an LTE+ network, devices providing a base station function include a next generation NodeB (gNB), a transmission and reception point (TRP), or a transmission point (TP). The TRP or TP may exclude a baseband part and include a radio frequency part, or may include a baseband part and a radio frequency part.

User equipment (UE) is a terminal device, which may be either a movable terminal device or an immovable terminal device. The equipment is mainly configured to receive or send service data. The user equipment may be distributed in a network, and the user equipment has different names in different networks, such as a terminal, a mobile station, a subscriber unit, a station, a cellular phone, a personal digital assistant, a wireless modem, a wireless communications device, a handheld device, a laptop computer, a cordless phone, a wireless local loop, or an in-vehicle device. The user equipment may communicate with one or more core networks via a radio access network (RAN) (an access part of a wireless communications network), for example, exchange voice and/or data with the radio access network.

A network-side device refers to a device deployed on a network side in a wireless communications network, and may be an access network network element, such as a base station or a controller (if any), or may be a core network network element or another network element.

The following describes technical solutions of this application with reference to the accompanying drawings.

Figure 1:
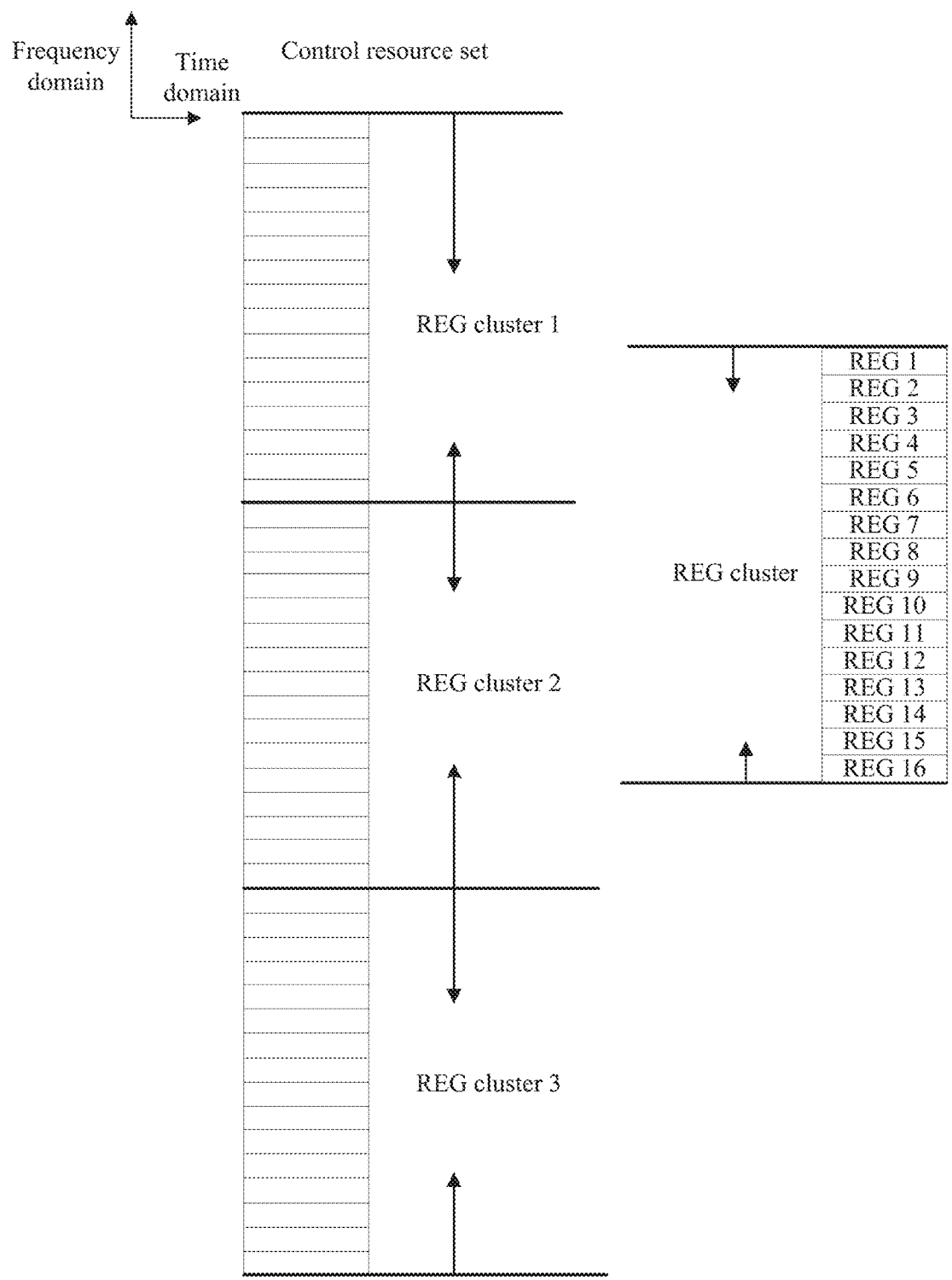
FIG. 1 is a schematic diagram of a control resource set according to this application.
Figure 2:
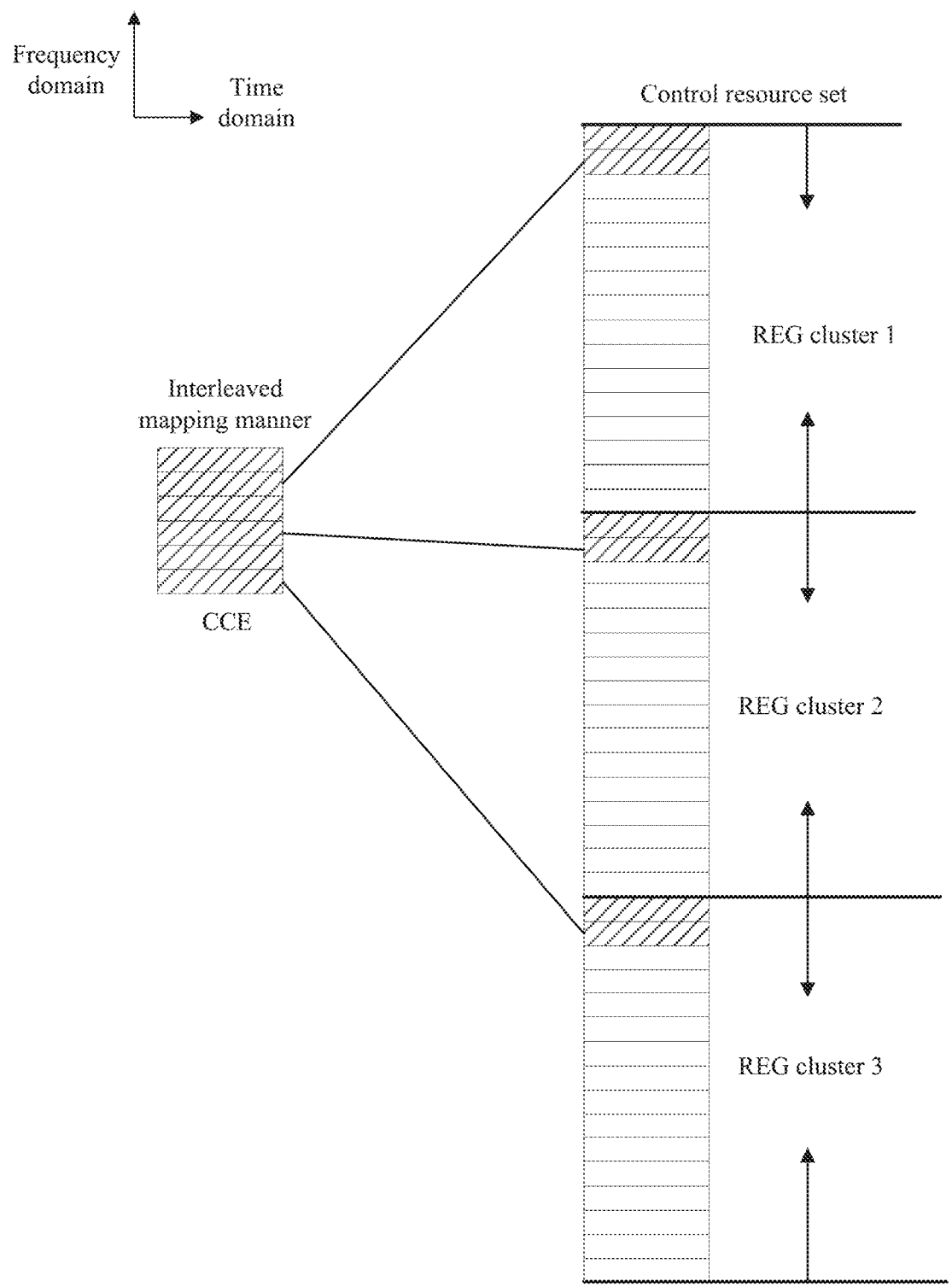
FIG. 2 is a schematic diagram of mapping a CCE to a REG bundle set according to this application.
Figure 3:
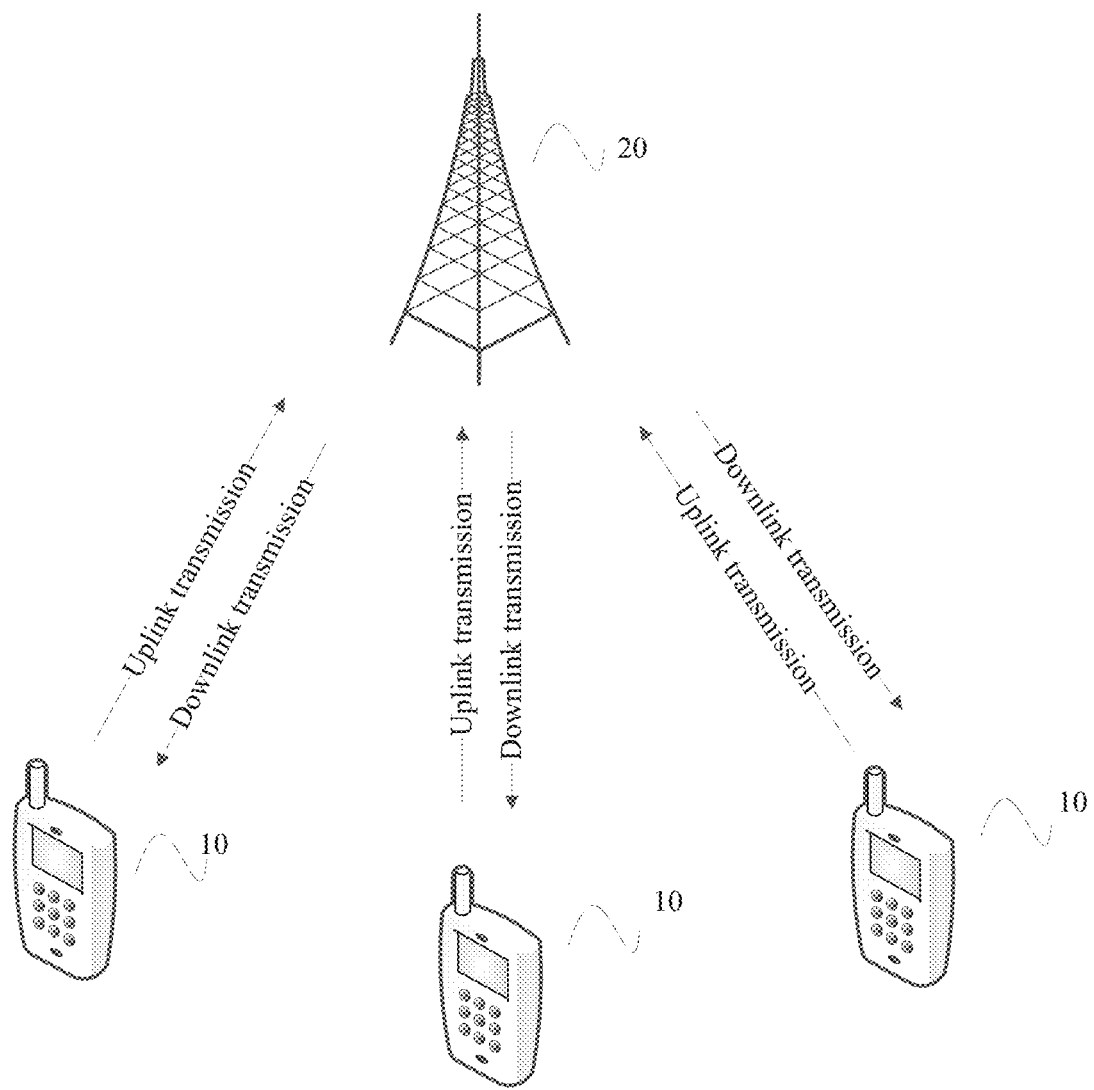
FIG. 3 is a schematic diagram of a wireless communications system according to this application.

FIG. 3 is a schematic diagram of a possible system network according to this application. As shown in FIG. 3, a communications system in FIG. 3 may include UE 10 and a base station 20. The base station 20 is configured to provide a communication service for the UE 10 and connect the UE 10 to a core network. The UE 10 accesses the network by searching for a synchronization signal, a broadcast signal, or the like sent by the base station 20, to communicate with the network. An arrow shown in FIG. 3 may indicate uplink/downlink transmission through a wireless communications network between the UE 10 and the base station 20.

The wireless communications network may use different communications technologies, such as code division multiple access (CDMA), wideband code division multiple access (WCDMA), time division multiple access (TDMA), frequency division multiple access (FDMA), orthogonal frequency division multiple access (OFDMA), single carrier frequency division multiple access (SC-FDMA), and carrier sense multiple access with collision avoidance. Based on capacities, rates, delays, or other factors of different networks, the networks may be classified into a 2G (generation) network, a 3G network, a 4G network, or a future evolved network, such as a 5G network. A typical 2G network includes a global system for mobile communications (GSM) network or a general packet radio service (GPRS) network, a typical 3G network includes a universal mobile telecommunications system (UMTS) network, and a typical 4G network includes a long term evolution (LTE) network. The UMTS network may sometimes be referred to as a universal terrestrial radio access network (UTRAN), and the LTE network may sometimes be referred to as an evolved universal terrestrial radio access network (E-UTRAN). Based on different resource allocation manners, the networks may be classified into a cellular communications network and a wireless local area network (WLAN). The cellular communications network is dominated by scheduling, and the WLAN is dominated by competition. The foregoing 2G, 3G and 4G networks are all cellular communications networks.

It should be noted that "a plurality of" in this application means two or more. The terms "first" and "second" in this application are used only for distinguished descriptions, but do not indicate or imply relative importance, nor indicate or imply an order.

Figure 4:
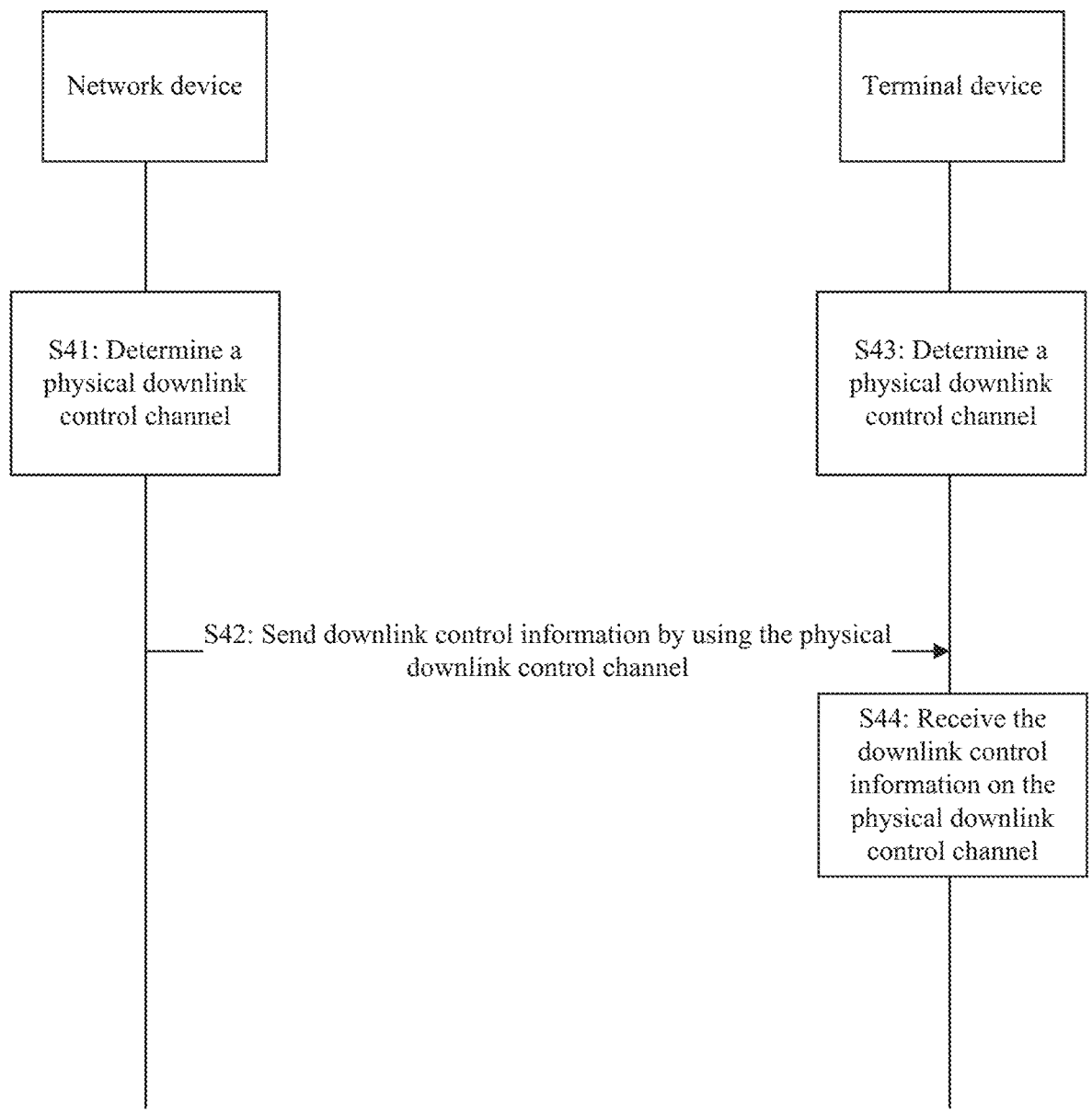
FIG. 4 is a flowchart of sending a physical downlink control channel according to this application.

FIG. 4 shows a procedure of sending a physical downlink control channel according to this application. A network device in the procedure corresponds to the base station 20 in FIG. 3, and a terminal device corresponds to the UE 10 in FIG. 3. As shown in FIG. 4, the procedure includes the following steps.

Step S41: The network device determines a physical downlink control channel (PDCCH).

In this application, there is a concept of control resource set. A control resource set (CORESET) includes a plurality of physical resource blocks in frequency domain and one or more OFDM symbols in time domain.

Figure 5:
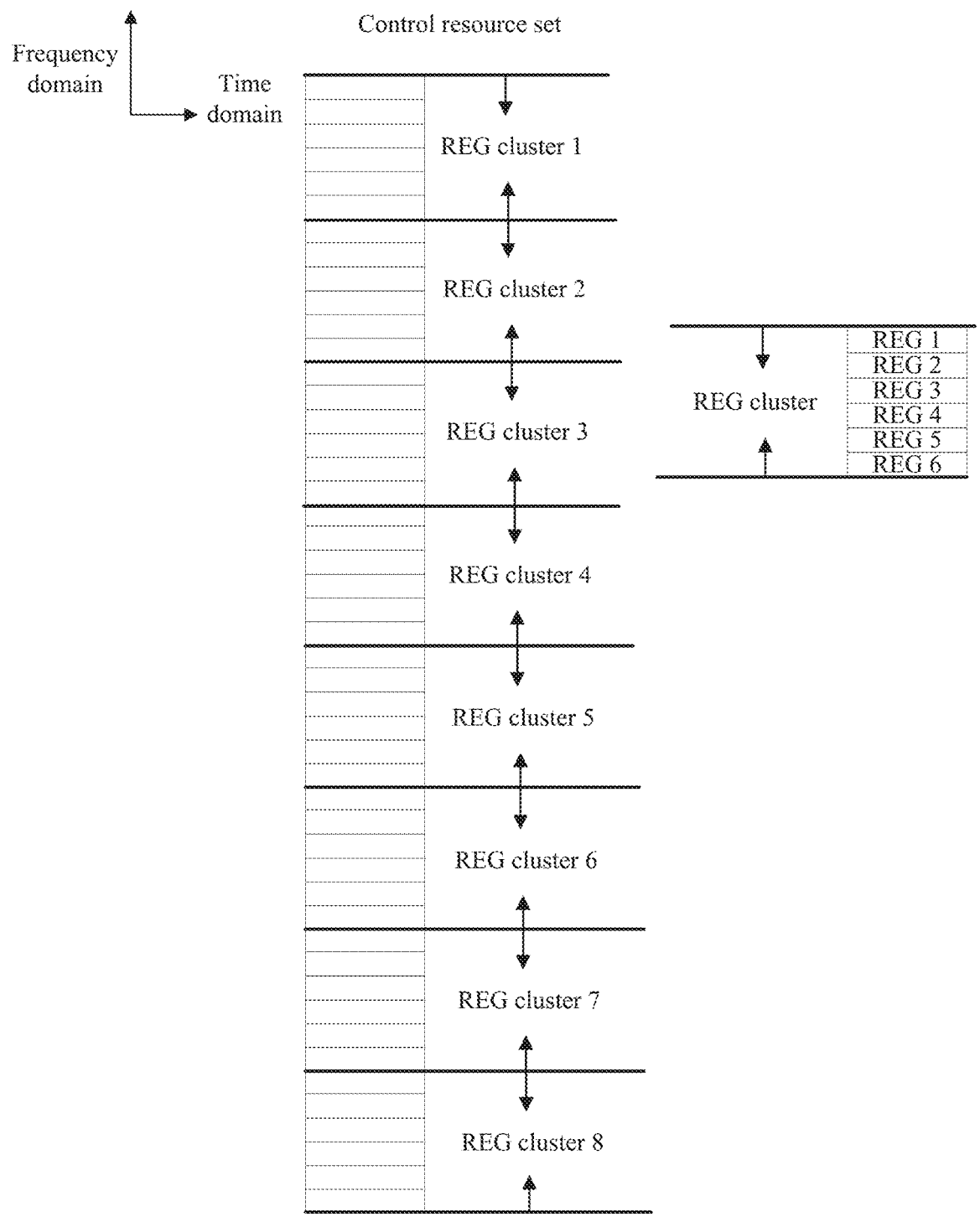
FIG. 5 is a schematic diagram of a control resource set according to this application.

The control resource set includes a plurality of resource element group (REG) clusters. For example, as shown in FIG. 5, a control resource set may include eight REG clusters: a REG cluster 1, a REG cluster 2, a REG cluster 3, a REG cluster 4, a REG cluster 5, a REG cluster 6, a REG cluster 7, and a REG cluster 8. Each REG cluster includes a plurality of consecutive physical resource blocks in frequency domain, and the plurality of physical resource blocks may correspond to a plurality of REGs. For example, still referring to FIG. 5, a REG cluster may include six REGs in frequency domain: a REG 1, a REG 2, a REG 3, a REG 4, a REG 5, and a REG 6. A REG occupies 12 consecutive subcarriers in frequency domain and one consecutive OFDM symbol in time domain.

In this application, a control resource set may be divided into a plurality of REG bundle sets, each REG bundle set includes a plurality of REG clusters, and the plurality of REG clusters are discrete in frequency domain. That the plurality of REG clusters are discrete in frequency domain may mean that any two REG clusters in the plurality of REG clusters are not adjacent in frequency domain, or that the plurality of REG clusters are discrete in frequency domain may mean that numbers of REGs included in any two REG clusters in the plurality of REG clusters are discontinuous. The numbers of the REGs are numbers of REGs in the control resource set in a time domain first or frequency domain first order. Each REG cluster includes a plurality of physical resource blocks that are consecutive in frequency domain.

A REG bundle includes a plurality of REGs that are consecutive in time domain or frequency domain. In a possible implementation, a same precoder is used in a REG bundle.

Optionally, a quantity of REGs included in the REG cluster that are consecutive in frequency domain is a configurable or predefined value, and the value is a multiple of 6. For example, the REG cluster may include six consecutive REGs, 12 consecutive REGs, or 18 consecutive REGs in frequency domain; or the quantity of the REGs included in the REG cluster in frequency domain is a least common multiple of one REG, two REGs, three REGs, and six REGs, or is an integral multiple of a least common multiple of one REG two REGs, three REGs, and six REGs. The value may be configured by using higher layer signaling such as RRC signaling.

In this application, a size of the REG cluster is applicable to REG bundle configurations in a plurality of CCE mapping methods. Therefore, a same interleaved mapping method may be used for different REG bundle configurations to simplify implementation complexity.

In a possible implementation, a quantity N of REG clusters included in the REG bundle set is predefined, and a frequency-domain spacing between adjacent REG clusters in the REG bundle set is proportional to a quantity of REG clusters included in the control resource set. For example, a smaller quantity of the REG clusters included in the control resource set indicates a smaller frequency-domain spacing between the adjacent REG clusters in the REG bundle set. On the contrary, a larger quantity of the REG clusters included in the control resource set indicates a larger frequency-domain spacing between the adjacent REG clusters in the REG bundle set.

It should be noted that, if the quantity of the REG clusters included in the REG bundle set is unchanged, because the spacing between the adjacent REG clusters in the REG bundle set is proportional to the quantity of the REG clusters included in the control resource set in frequency domain, the spacing between the adjacent REG clusters in the REG bundle set increases with the quantity of the REG clusters included in the control resource set, and more frequency diversity gains may be obtained.

It should also be noted that, the REG bundle set may specifically include N REG clusters, and N is associated with the quantity of the REG clusters included in the control resource set. For example, a larger quantity of the REG clusters included in the control resource set indicates a smaller quantity of the REG clusters included in the REG bundle set. Certainly, a larger quantity of the REG clusters included in the control resource set may alternatively indicate a larger quantity of the REG clusters included in the REG bundle set.

The quantity N of the REG clusters included in the REG bundle set may alternatively be derived from a quantity M of the REG clusters included in the control resource set. In other words, a value of N may be determined based on a quantity M of the REG clusters included in the control resource set.

In an example, a control resource set includes M REG clusters, a REG bundle set includes N REG clusters, and both M and N are integers. When a condition 1 is met, N may be set to 2. For example, the condition 1 may be that M is a multiple of 2.

In this application, for example, if M is set to 8, N may be set to 2 because 8 is a multiple of 2. To be specific, if a control resource set includes eight REG clusters, the entire control resource set may be divided into four REG bundle sets, and each REG bundle set includes two REG clusters.

In another example, a control resource set includes M REG clusters, a REG bundle set includes N REG clusters, and both M and N are integers. When a condition 2 is met, N may be set to 3. For example, the condition 2 may be that M is a multiple of 3 but is not a multiple of 2.

In this application, for example, if M is set to 9, N may be set to 3 because 9 is a multiple of 3 but is not a multiple of 2. To be specific, if a control resource set includes nine REG clusters, the entire control resource set may be divided into three REG bundle sets, and each REG bundle set includes three REG clusters.

In this application, the value of N is dynamically configured based on the quantity of the REG clusters included in the control resource set in frequency domain. For interleaved mapping, there may be a case in which clusters are completely dispersed and a case in which clusters are partly dispersed, and the two cases are configurable. Therefore, different configurations may be implemented in different scenarios, the frequency diversity gain may be increased when clusters are completely dispersed, and resource fragmentation may be reduced when clusters are partly dispersed. In addition, a system may achieve more flexible configuration and support a plurality of application scenarios.

Figure 6:
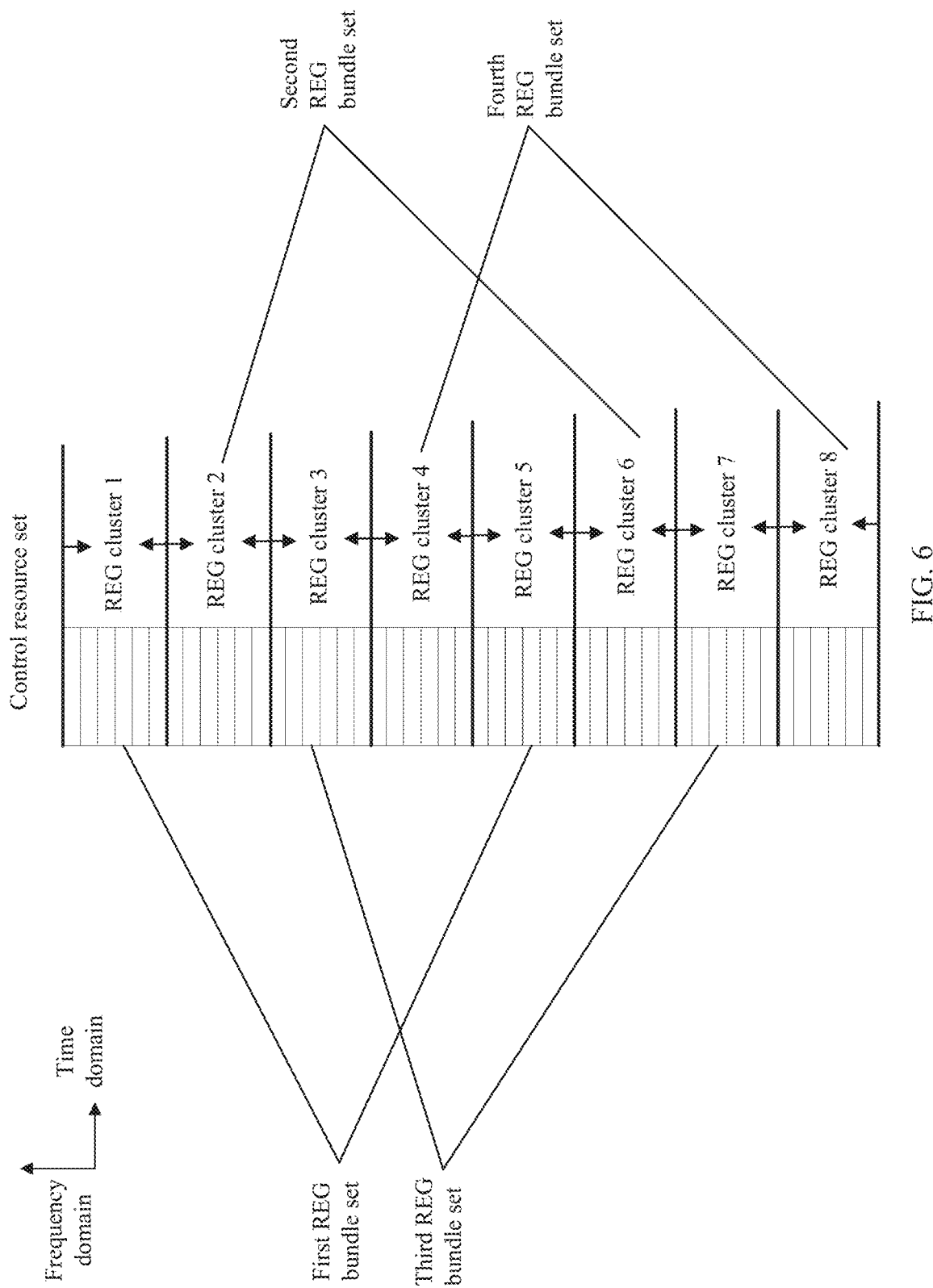
FIG. 6 is a schematic diagram of a REG bundle set according to this application.

In this application, as shown in FIG. 6, a control resource set includes eight REG clusters: a REG cluster 1, a REG cluster 2, a REG cluster 3, a REG cluster 4, a REG cluster 5, a REG cluster 6, a REG cluster 7, and a REG cluster 8. In this application, the control resource set shown in FIG. 6 may be specifically divided into four REG bundle sets: a first REG bundle set, a second REG bundle set, a third REG bundle set, and a fourth REG bundle set. The first REG bundle set may include the REG cluster 1 and the REG cluster 5, the second REG bundle set may include the REG cluster 2 and the REG cluster 6, the third REG bundle set may include the REG cluster 3 and the REG cluster 7, and the fourth REG bundle set may include the REG cluster 4 and the REG cluster 8.

In this application, each CCE included in the physical downlink control channel may be specifically mapped to a REG cluster in a REG bundle set. Manners of mapping a CCE to a REG cluster may be specifically classified into an interleaved mapping manner and a non-interleaved mapping manner, and both the interleaved mapping and the non-interleaved mapping are performed in a unit of a REG bundle. The REG bundle includes a plurality of REGs that are consecutive in frequency domain and/or time domain. A same precoder is used in a same REG bundle. For example, a unit that includes one REG in time domain and two consecutive REGs in frequency domain may be referred to as a 1×2 REG bundle. There are a plurality of types of REG bundles. To ensure that a same rule of mapping a CCE to a REG is used for the plurality of types of REG bundles, the quantity of the REGs included in the REG cluster in frequency domain may be set to an integral multiple of a quantity of REGs included in all REG bundles in frequency domain, to reduce the complexity of resource mapping. A size of the REG bundle is represented as [A×B], where A represents a quantity of REGs that are consecutive in time domain, and B represents a quantity of REGs that are consecutive in frequency domain.

Figure 7A:
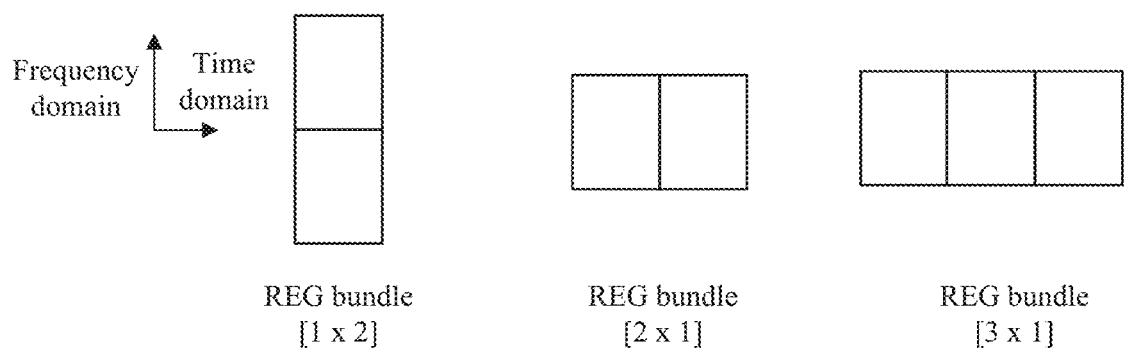
FIG. 7*a* and FIG. 7*b* are schematic diagrams of a REG bundle according to this application.
Figure 7B:
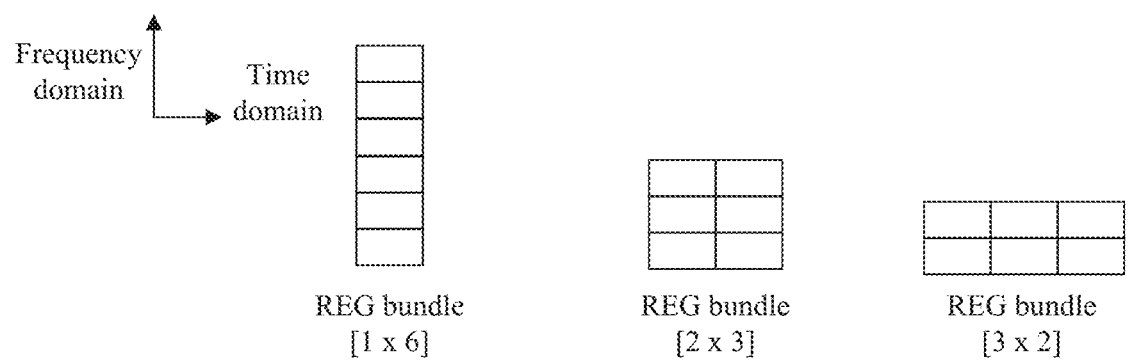

In this application, as shown in FIG. 7a, a size of a corresponding REG bundle for the interleaved mapping may be specifically [1×2], [2×1], or [3×1]. As shown in FIG. 7b, a size of a corresponding REG bundle for the non-interleaved mapping may be specifically [1×6], [2×3], or [3×2].

Certainly, in this application, the size of the corresponding REG bundle for the interleaved mapping may alternatively be shown in FIG. 7b, and the size of the corresponding REG bundle for the non-interleaved mapping may alternatively be shown in FIG. 7a.

In this application, if the interleaved mapping manner is used for the physical downlink control channel, a corresponding CCE is a first CCE, and if the non-interleaved mapping manner is used, a corresponding CCE is a second CCE. A quantity of REGs included in the first REG bundle is the same as a quantity of REGs included in the second REG bundle, and the REG bundle includes a plurality of REGs that are consecutive in time domain and/or frequency domain. A same type of REG bundles is used for the interleaved mapping and the non-interleaved mapping, thereby reducing the complexity in the interleaved mapping manner.

An execution procedure of the interleaved mapping manner is specifically as follows: The network device obtains a first CCE, where the first CCE is a CCE when the physical downlink control channel is formed in the interleaved mapping manner. The network device maps the first CCE to a plurality of REG clusters in the REG bundle set in an interleaved manner, where quantities of REG bundles that are used to map the CCE and that are in any two REG clusters in the plurality of REG clusters are different, or quantities of REGs that are used to map the CCE and that are in any two REG clusters in the plurality of REG clusters are different.

Figure 8:
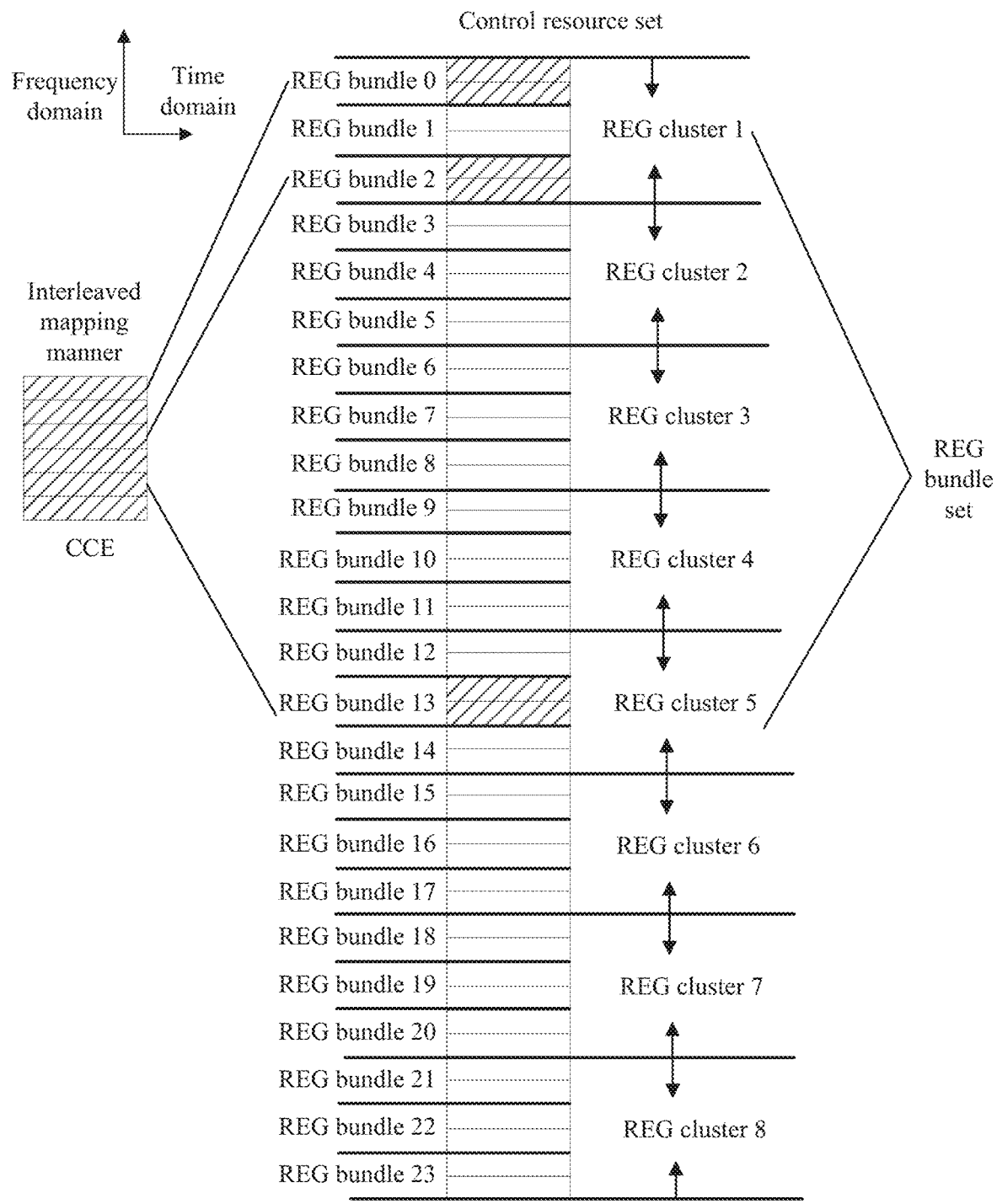
FIG. 8 is a schematic diagram of an interleaved mapping manner according to this application.

In this application, as shown in FIG. 8, it is assumed that a CCE includes six REGs, a REG bundle set includes a REG cluster 1 and a REG cluster 5, and a size of a REG bundle for interleaved mapping is [1×2]. Two REG bundles in the CCE may be mapped to the REG cluster 1, for example, mapped to a REG bundle 0 and a REG bundle 1 in the REG cluster 1. One REG bundle in the CCE is mapped to a REG bundle in the REG cluster 5, for example, mapped to a REG bundle 13 in the REG cluster 5. Certainly, in this application, two REG bundles in the CCE may be mapped to the REG cluster 5, and one REG bundle may be mapped to the REG cluster 1. Details are not described herein again.

In this application, if a physical downlink control channel includes four CCEs: a CCE 0, a CCE 1, a CCE 2, and a CCE 3, a procedure of specifically mapping a CCE in the physical downlink control channel to REG clusters in the REG bundle set is as follows: Obtain a number of the CCE in the physical downlink control channel, for example, a number of the CCE 0 in the physical downlink control channel may be 0, and a number of the CCE 1 in the physical downlink control channel may be 1. Then, determine, based on the number of the CCE and a preset interleaved mapping rule, a location to which the CCE is mapped in the REG cluster in the REG bundle set, for example, as shown in FIG. 7, locations to which the CCE is mapped in the REG cluster the REG bundle set may be specifically the REG bundle 0 and the REG bundle 2 in the REG cluster 1, and the REG bundle 13 in the REG cluster 5.

In this application, the foregoing interleaved mapping rule may include selecting, at equal spacings from a plurality of REG bundles in the REG bundle set, REG bundles to which the CCE is mapped.

As shown in FIG. 8, a REG bundle set includes 12 REGs, and a REG bundle includes one REG in time domain and two consecutive REGs in frequency domain. Therefore, a REG bundle set includes six REG bundles. The six REG bundles may be denoted as a REG bundle 0, a REG bundle 1, a REG bundle 2, a REG bundle 12, a REG bundle 13, and a REG bundle 14. Because the CCE includes six REGs, the CCE includes three REG bundles. REG bundles corresponding to the CCE that are obtained by extracting from the six REG bundles at equal spacings in ascending order of numbers of the REG bundles are the REG bundle 0, the REG bundle 2, and the REG bundle 13.

Alternatively, in another implementation, the numbers of the REG bundles included in the REG bundle set are interleaved, and an interleaving method may be bit flipping, inputting the numbers of the REG bundles into an interleaving matrix, or another method, to obtain an interleaved REG bundle number.

For example, the numbers of the REG bundles included in the REG bundle set are {0, 1, 2, 12, 13, 14}. The numbers of the REG bundles may be input into the interleaving matrix by row and output by column, a null value is filled for an unfilled part in the interleaving matrix. Columns of an interleaver are rearranged. A rearrangement method is to perform bit flipping on numbers of columns of the interleaving matrix to obtain new column numbers, and output REG bundle numbers by column. The previously filled null value is removed.

If {0, 1, 2, 12, 13, 14} is input into a matrix having eight columns, column numbers of the matrix may be denoted as {0, 1, 2, 3, 4, 5, 6, 7}. After bit flipping, corresponding column numbers are {0, 4, 2, 6, 1, 5, 3, 7}. The columns of the interleaving matrix are rearranged based on the new column numbers. REG bundle numbers output in a matrix column-major order are {0, 13, 2, 1, 14, 12}. Therefore, resources that are of the first CCE and that are included in the REG bundle set are REG bundle 0, the REG bundle 13, and the REG bundle 2, and resources that are of the second CCE and that are included in the REG bundle set are the REG bundle 1, the REG bundle 14, and the REG bundle 12.

In this application, that a CCE is mapped to each REG cluster in a REG bundle set in an interleaved manner may maintain a specific frequency diversity gain. In addition, because quantities of mapped REGs in different REG clusters are different, the dispersion degree of REGs that are mapped in the interleaved manner may be restricted, and a quantity of resource fragments is reduced. Therefore, the method maintains a specific frequency diversity gain, and reduces the degree of resource fragmentation.

The non-interleaved mapping procedure is specifically as follows: The network device obtains a second CCE, where the second CCE is a CCE when the physical downlink control channel is formed in the non-interleaved mapping manner. The network device maps the second CCE to a REG cluster in the REG bundle set in a non-interleaved manner, where the REG cluster includes X REG resources, the CCE needs to occupy Y REG resources, X and Y are integers, and X is an integral multiple of Y.

Figure 9:
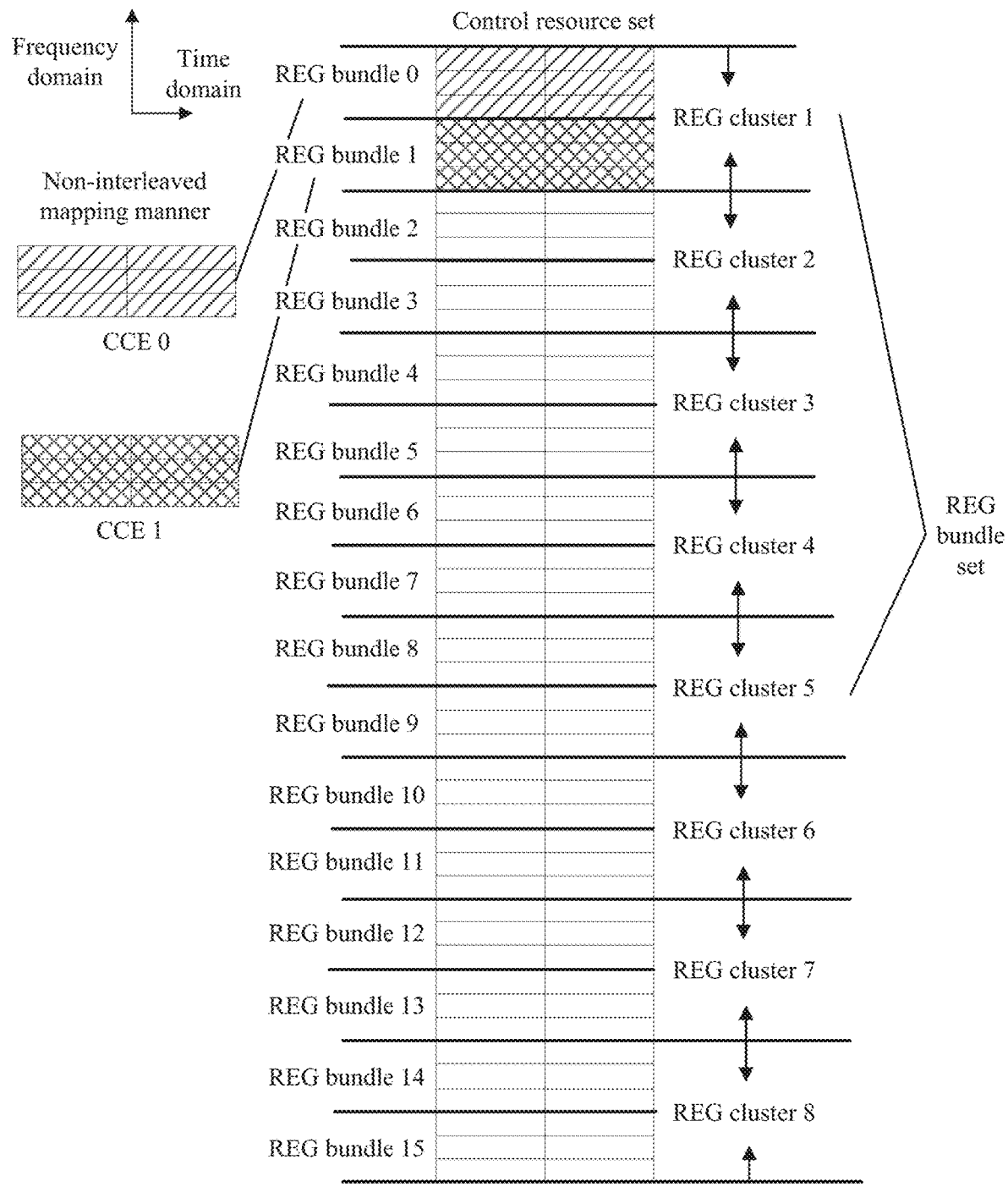
FIG. 9 is a schematic diagram of a non-interleaved mapping manner according to this application.

For example, as shown in FIG. 9, a control resource set includes a REG cluster 1, a REG cluster 2, a REG cluster 3, a REG cluster 4, a REG cluster 5, a REG cluster 6, a REG cluster 7, and a REG cluster 8, and the REG cluster 1 and the REG cluster 5 form a REG bundle set. A physical downlink control channel includes at least a CCE 0 and a CCE 1, and sizes of REG bundles included in the CCE 0 and the CCE 1 are [2×3]. The CCE 0 may be mapped to a REG bundle 0 in the REG cluster 1, and the CCE 1 may be mapped to another REG bundle in the REG cluster 1.

In this application, that a CCE is mapped to each REG cluster in a REG bundle set in an interleaved manner may maintain a specific frequency diversity gain. In addition, because quantities of mapped REGs in different REG clusters are different, the dispersion degree of REGs that are mapped in the interleaved manner may be restricted, and a quantity of resource fragments is reduced. Therefore, the method maintains a specific frequency diversity gain, and reduces the degree of resource fragmentation.

Step S42: The network device sends downlink control information by using the physical downlink control channel.

Step S43: The terminal device determines the physical downlink control channel.

Step S44: The terminal device receives the downlink control information through the physical downlink control channel.

In this application, after receiving the downlink control information, the terminal device may perform the following processing, for example: The terminal device determines, based on the control information, a time-frequency resource at which a downlink data channel is located, and receives data information on the time-frequency resource of the downlink data channel; or the terminal device determines, based on the control information, a time-frequency resource at which an uplink data channel is located, and sends data information on the time-frequency resource of the uplink channel.

It may be learned that, in this application, because the CCE included in the physical downlink control channel is mapped to a REG bundle set in a plurality of REG bundle sets included in the control resource set, the CCE can occupy only REG resources in the REG bundle set. Compared with the prior art in which a CCE is mapped on an entire physical downlink control channel, and may occupy REG resources on the entire physical downlink control channel, the method provided in this application can reduce the degree of fragmentation of the physical downlink control channel and improve the resource utilization rate.

Figure 10:
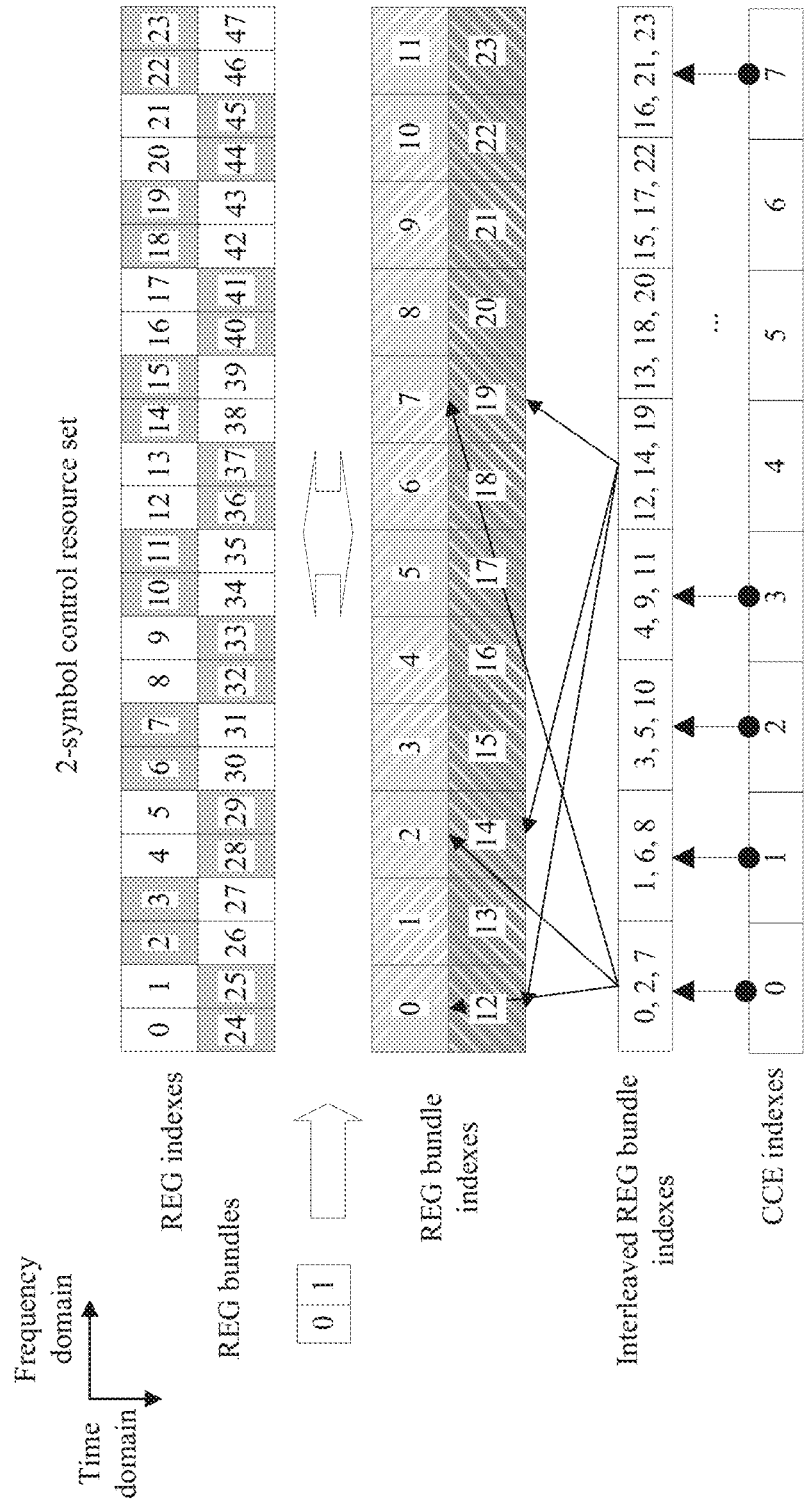
FIG. 10 is a schematic diagram of interleaved mapping according to this application.

In this application, as shown in FIG. 10, for example, a 2-symbol control resource set includes 24 REG bundles numbered from 0 to 23. Each REG bundle includes two REGs, for example, a REG bundle 0 includes a REG 0 and a REG 1. In this application, it is assumed that a physical downlink control channel includes eight CCEs: a CCE 0 to a CCE 7. In this application, the CCE 0 may be mapped to the REG bundle 0, a REG bundle 2, and a REG bundle 7, the CCE 1 may be mapped to a REG bundle 1, a REG bundle 6, a REG bundle 8, and the like.

Figure 11:
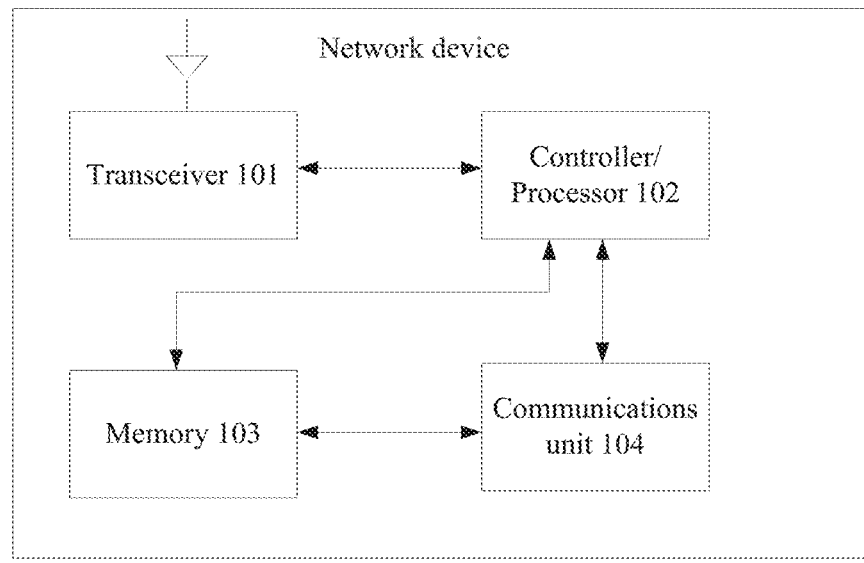
FIG. 11 is a schematic structural diagram of a network device according to this application.

FIG. 11 is a possible schematic structural diagram of a based station in the foregoing embodiments of this application. The base station may be the base station 20 in FIG. 3 or the network device in FIG. 4.

In this application, the base station includes a transceiver 101 and a controller/processor 102. The transceiver 101 may be configured to support information receiving and sending between the base station and the terminal device in the foregoing embodiments, and support radio communication between the base station and a core network device.

The controller/processor 102 is configured to perform various functions used for communication with the terminal device and the core network device. On an uplink, an uplink signal from the terminal device is received by using an antenna, demodulated by the transceiver 101, and is further processed by the controller/processor 102 to restore service data and signaling information that are sent by the terminal device. On a downlink, the controller/processor 102 processes service data and a signaling message, the transceiver 101 performs modulation to generate a downlink signal, and the downlink signal is sent to UE by using the antenna. The controller/processor 102 is further configured to perform the information sending method described in the foregoing embodiments, determine a physical downlink control channel, and send control information through the physical downlink control channel. The controller/processor 102 is further configured to perform processing processes of the network device in FIG. 4 and/or is configured to perform other processes of technologies described in this application. The base station may further include a memory 103 that may be configured to store program code and data of the base station. The base station may further include a communications unit 104, configured to support communication between the base station and another network entity, for example, configured to support communication between the base station and the core network device that is shown in FIG. 5 or FIG. 9.

It may be understood that, FIG. 11 merely shows a simplified design of the base station. In an actual application, the base station may include any quantity of transmitters, receivers, processors, controllers, memories, communications units, or the like. All base stations that can implement this application fall within the protection scope of this application.

Figure 12:
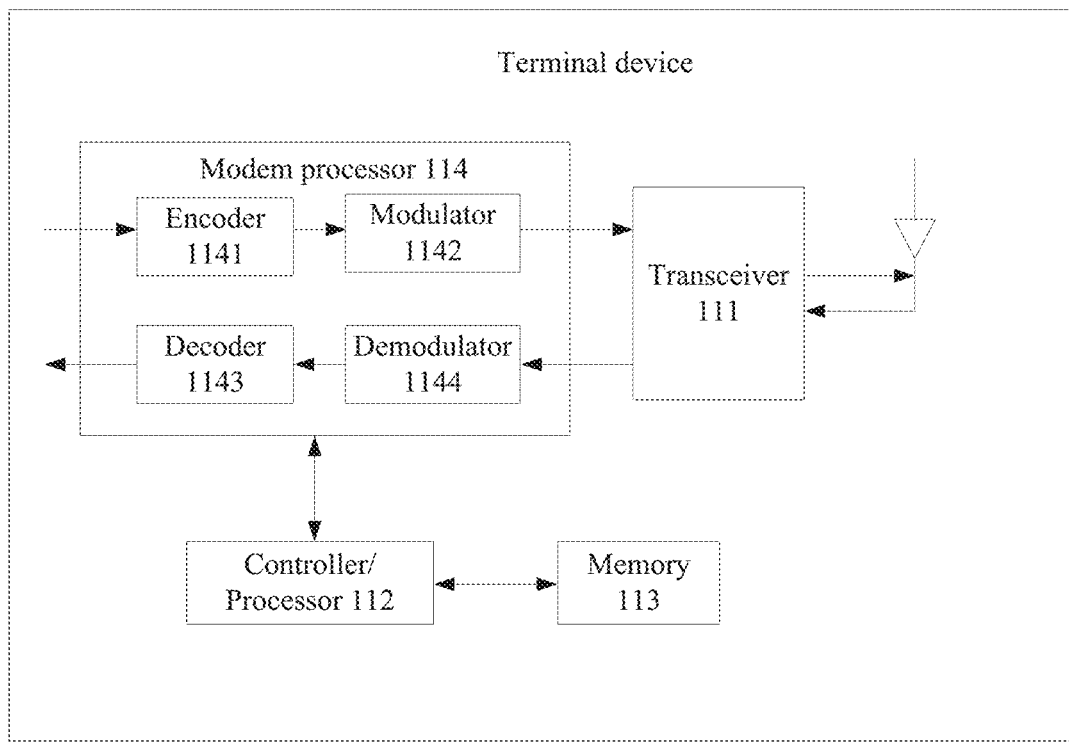
FIG. 12 is a schematic structural diagram of a terminal device according to this application.

FIG. 12 is a simplified schematic diagram of a possible design structure of a terminal device in the embodiments of this application. The terminal device may be the UE 20 shown in FIG. 3 or the terminal device shown in FIG. 4. The terminal device includes a transceiver 111 and a controller/processor 112, and may further include a memory 113 and a modem processor 114.

The transceiver 111 adjusts (for example, performs analog conversion, filtering, amplification, up-conversion, and the like on) the output sample and generates an uplink signal, and the uplink signal is transmitted to the base station in the foregoing embodiments by using an antenna. On a downlink, the antenna receives a downlink signal transmitted by the base station in the foregoing embodiments. The transceiver 111 adjusts (for example, performs filtering, amplification, down-conversion, digitalization, and the like on) the signal received from the antenna, and provides an input sample. In the modem processor 114, an encoder 1141 receives service data and a signaling message that are to be sent on an uplink, and processes (for example, performs formatting, encoding, and interleaving on) the service data and the signaling message. A modulator 1142 further processes (for example, performs symbol mapping and modulation on) encoded service data and an encoded signaling message, and provides an output sample. A decoder 1143 processes (for example, performs de-interleaving and decoding on) the symbol estimate, and provides decoded data and a decoded signaling message that are sent to the terminal device. A demodulator 1144 processes (for example, performs demodulation on) the input sample and provides a symbol estimate. The encoder 1141, the modulator 1142, the decoder 1143, and the demodulator 1144 may be implemented by a combined modem processor 114. These units perform processing according to radio technologies (for example, access technologies of an LTE system and another evolved system) used by a radio access network.

The controller/processor 112 performs control and management on an action of the terminal device, and is configured to perform processing performed by the terminal device in the foregoing embodiments. The terminal device may determine a physical downlink control channel and receive downlink control information through the physical downlink control channel. The controller/processor 112 may be configured to support the terminal device in performing the content of the terminal device in FIG. 4. The memory 113 is configured to store program code and data of the terminal device.

This application further provides a readable storage medium, including an instruction. When the instruction is run on a communications device, the communications device is enabled to perform the information sending method in the foregoing embodiments.

In addition, this application further provides a chip. The chip is connected to a memory, and is configured to read and execute a software program stored in the memory, to implement the information sending method in the foregoing embodiments.

All or some of the foregoing embodiments may be implemented by means of software, hardware, firmware, or any combination thereof. When software is used to implement the embodiments, the embodiments may be implemented completely or partly in a form of a computer program product. The computer program product includes one or more computer instructions. The computer program instructions are loaded and executed on a computer, to implement some or all of the procedure or functions according to the embodiments of the present invention. The computer may be a general-purpose computer, a special-purpose computer, a computer network, or another programmable apparatus. The computer instructions may be stored in a computer readable storage medium or may be transmitted from one computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive), or the like.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of any other programmable data processing device to generate a machine, so that the instructions executed by the computer or the processor of the any other programmable data processing device generate an apparatus for implementing a specific function in one or more processes in the flowcharts and/or in one or more blocks in the block diagrams.

These computer program instructions may be stored in a computer readable memory that can instruct the computer or the any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Apparently, persons skilled in the art can make various modifications and variations to the embodiments of this application without departing from the spirit and scope of the embodiments of the present invention. Therefore, this application is intended to cover these modifications and variations provided that they fall within the scope of protection defined by the following claims and their equivalent technologies.

What is claimed is:

1. A method comprising:
   determining, by a network device, a physical downlink control channel, wherein the physical downlink control channel comprises at least one control channel element (CCE), wherein the at least one CCE is mapped to a resource element group (REG) bundle set, wherein the REG bundle set comprises N REG clusters that are discrete in frequency domain, wherein each REG cluster comprises a plurality of consecutive physical resource blocks in frequency domain, wherein N is less than M, wherein M is a quantity of REG clusters comprised in a control resource set, and wherein both N and M are positive integers; and
   sending, by the network device, downlink control information by using the physical downlink control channel.

2. The method according to claim 1, wherein determining a physical downlink control channel comprises:
   determining, by the network device, a first CCE; and
   mapping, by the network device, the first CCE to each REG cluster in the REG bundle set in an interleaved manner, wherein quantities of REGs that are used to map the first CCE and that are in at least two of the REG clusters are different.

3. The method according to claim 2, wherein mapping the first CCE to each REG cluster in the REG bundle set in an interleaved manner comprises:
   distributing, by the network device, REG bundles comprised in the first CCE into the REG bundle set at equal spacings, wherein the REG bundle comprises a plurality of REGs that are consecutive in at least one of time domain or frequency domain.

4. The method according to claim 2, wherein determining a physical downlink control channel comprises:
   obtaining, by the network device, a second CCE; and
   mapping, by the network device, the second CCE to a REG cluster in the REG bundle set in a non-interleaved manner, wherein the REG cluster comprises X REG resources in frequency domain, wherein the second CCE occupies Y REG resources in frequency domain, wherein X and Y are integers, and wherein X is an integral multiple of Y.

5. The method according to claim 4, wherein the first CCE is mapped in an interleaved manner in a unit of a first REG bundle, wherein the second CCE is mapped in a unit of a second REG bundle, wherein a quantity of REGs comprised in the first REG bundle is the same as a quantity of REGs comprised in the second REG bundle, and wherein the REG bundle comprises a plurality of REGs that are consecutive in at least one of time domain or frequency domain.

6. A method comprising:
   determining, by a terminal device, a physical downlink control channel, wherein the physical downlink control channel comprises at least one control channel element (CCE), wherein the at least one CCE is mapped to a resource element group (REG) bundle set, wherein the REG bundle set comprises N REG clusters that are discrete in frequency domain, wherein each REG cluster comprises a plurality of consecutive physical resource blocks in frequency domain, wherein N is less than M, wherein M is a quantity of REG clusters comprised in a control resource set, and wherein both N and M are positive integers; and
   receiving, by the terminal device, downlink control information through the physical downlink control channel.

7. The method according to claim 6, wherein the physical downlink control channel comprises a first CCE, wherein the first CCE is mapped to each REG cluster in the REG bundle set in an interleaved manner, and wherein quantities of REGs that are used to map the first CCE and that are in at least two of the REG clusters are different.

8. The method according to claim 7, wherein REG bundles comprised in the first CCE are distributed in the REG bundle set at equal spacings, and wherein the REG bundle comprises a plurality of REGs that are consecutive in at least one of time domain or frequency domain.

9. The method according to claim 7, wherein the physical downlink control channel comprises a second CCE, wherein the second CCE is mapped to a REG cluster in the REG bundle set in a non-interleaved manner, wherein the REG cluster comprises X REG resources in frequency domain, wherein the second CCE occupies Y REG resources in frequency domain, wherein X and Y are integers, and wherein X is an integral multiple of Y.

10. The method according to claim 9, wherein the first CCE is mapped in an interleaved manner in a unit of a first REG bundle, wherein the second CCE is mapped in a unit of a second REG bundle, wherein a quantity of REGs comprised in the first REG bundle is the same as a quantity of REGs comprised in the second REG bundle, and wherein the REG bundle comprises a plurality of REGs that are consecutive in at least one of time domain or frequency domain.

11. An apparatus, comprising:
    at least one processor; and
    a non-transitory computer-readable storage medium coupled to the at least one processor and storing programming instructions for execution by the at least one processor, wherein the programming instructions instruct the apparatus to:
    determine a physical downlink control channel, wherein the physical downlink control channel comprises at least one control channel element CCE, wherein the at least one CCE is mapped to a REG bundle set, wherein the REG bundle set comprises N REG clusters that are discrete in frequency domain, wherein each REG cluster comprises a plurality of consecutive physical resource blocks in frequency domain, wherein N is less than M, wherein M is a quantity of REG clusters comprised in a control resource set, and wherein both N and M are positive integers; and
    send downlink control information by using the physical downlink control channel.

12. The apparatus according to claim 11, wherein when determining the physical downlink control channel, the programming instructions instruct the apparatus to:
    determine a first CCE; and
    map the first CCE to each REG cluster in the REG bundle set in an interleaved manner, wherein quantities of REGs that are used to map the first CCE and that are in at least two of the REG clusters are different.

13. The apparatus according to claim 12, wherein when mapping the first CCE to each REG cluster in the REG bundle set in an interleaved manner, the programming instructions instruct the apparatus to:
    distribute REG bundles comprised in the first CCE into the REG bundle set at equal spacings, wherein the REG bundle comprises a plurality of REGs that are consecutive in at least one of time domain or frequency domain.

14. The apparatus according to claim 12, wherein when determining the physical downlink control channel, the programming instructions instruct the apparatus to:

obtain a second CCE; and map the second CCE to a REG cluster in the REG bundle set in a non-interleaved manner, wherein the REG cluster comprises X REG resources in frequency domain, wherein the second CCE occupies Y REG resources in frequency domain, wherein X and Y are integers, and wherein X is an integral multiple of Y.

15. The apparatus according to claim 14, wherein the first CCE is mapped in an interleaved manner in a unit of a first REG bundle, wherein the second CCE is mapped in a unit of a second REG bundle, wherein a quantity of REGs comprised in the first REG bundle is the same as a quantity of REGs comprised in the second REG bundle, and wherein the REG bundle comprises a plurality of REGs that are consecutive in at least one of time domain or frequency domain.

16. An apparatus comprising:

at least one processor; and a non-transitory computer-readable storage medium coupled to the at least one processor and storing programming instructions for execution by the at least one processor, wherein the programming instructions instruct the apparatus to:

determine a physical downlink control channel, wherein the physical downlink control channel comprises at least one control channel element CCE, wherein the at least one CCE is mapped to a REG bundle set, wherein the REG bundle set comprises N REG clusters that are discrete in frequency domain, wherein each REG cluster comprises a plurality of consecutive physical resource blocks in frequency domain, wherein N is less than M, wherein M is a quantity of REG clusters comprised in a control resource set, and wherein both N and M are positive integers; and receive downlink control information through the physical downlink control channel.

17. The apparatus according to claim 16, wherein the physical downlink control channel comprises a first CCE, wherein the first CCE is mapped to each REG cluster in the REG bundle set in an interleaved manner, and wherein quantities of REGs that are used to map the first CCE and that are in at least two of the REG clusters are different.

18. The apparatus according to claim 17, wherein REG bundles comprised in the first CCE are distributed in the REG bundle set at equal spacings, and wherein the REG bundle comprises a plurality of REGs that are consecutive in at least one of time domain or frequency domain.

19. The apparatus according to claim 17, wherein the physical downlink control channel comprises a second CCE, wherein the second CCE is mapped to a REG cluster in the REG bundle set in a non-interleaved manner, wherein the REG cluster comprises X REG resources in frequency domain, wherein the second CCE occupies Y REG resources in frequency domain, wherein X and Y are integers, and wherein X is an integral multiple of Y.

20. The apparatus according to claim 19, wherein the first CCE is mapped in an interleaved manner in a unit of a first REG bundle, wherein the second CCE is mapped in a unit of a second REG bundle, wherein a quantity of REGs comprised in the first REG bundle is the same as a quantity of REGs comprised in the second REG bundle, and wherein the REG bundle comprises a plurality of REGs that are consecutive in at least one of time domain or frequency domain.

* * * * *